US012719004B2

(12) United States Patent
Graham

(10) Patent No.: US 12,719,004 B2
(45) Date of Patent: Aug. 25, 2026

(54) XD RELAY WITH MANUAL OVERRIDE KNOB

(71) Applicant: Eric Graham, Bellingham, WA (US)

(72) Inventor: Eric Graham, Bellingham, WA (US)

( * ) Notice: Subject to any disclaimer, the term of this patent is extended or adjusted under 35 U.S.C. 154(b) by 360 days.

(21) Appl. No.: 17/885,133

(22) Filed: Aug. 10, 2022

(65) Prior Publication Data

US 2023/0064811 A1 Mar. 2, 2023

Related U.S. Application Data

(60) Provisional application No. 63/232,014, filed on Aug. 11, 2021.

(51) Int. Cl.
*H01H 50/64* (2006.01)
*H01H 50/24* (2006.01)
*H01H 51/22* (2006.01)

(52) U.S. Cl.
CPC .......... *H01H 50/643* (2013.01); *H01H 50/24* (2013.01); *H01H 51/2263* (2013.01)

(58) Field of Classification Search
CPC .. H01H 50/643; H01H 50/24; H01H 51/2263; H01H 2050/328; H01H 50/326
USPC .......................................................... 361/206
See application file for complete search history.

(56) References Cited

U.S. PATENT DOCUMENTS 4,220,937 A * 9/1980 Ritzenthaler ........ H01H 50/326 335/186
5,000,692 A * 3/1991 Taniguchi .......... G05B 19/0423 439/502
5,559,664 A * 9/1996 Dogul .................. G08B 13/183 714/E11.167
6,414,577 B1 * 7/2002 Hoffman ............ H01H 51/2209 335/229
2016/0314922 A1 * 10/2016 Noellat ................ H01H 50/546

* cited by examiner

*Primary Examiner* — Sreeya Sreevatsa
(74) *Attorney, Agent, or Firm* — White-Welker & Welker, LLC; Matthew T. Welker, Esq.

(57) ABSTRACT

A modular family of electrical switching relays that utilize interchangeable mechanical override knobs or blank fillers, combined with enclosures capable of containing two or more independently operable relays; where each independent operating relay can selectively be constructed to either have a mechanical override knob or to have a blank filler thus resulting in a broad number of product permutations from a minimum number of unique components that are required to build those permutations. An electromechanical relay with rotary manual on and off override control where the manual on and off control consists of three distinct positions for (1) forcing/maintaining the relay on, (2) forcing/maintaining the relay off, and (3) allowing the relay to automatically turn on and off or to be remotely turned on and off with an electrical signal. An electromechanical push/pull relay with manual on and off override control where the axis of rotation of the manual override control is perpendicular to the axis of relay push/pull direction.

9 Claims, 14 Drawing Sheets

Knob in Force OFF Position

FIG 12
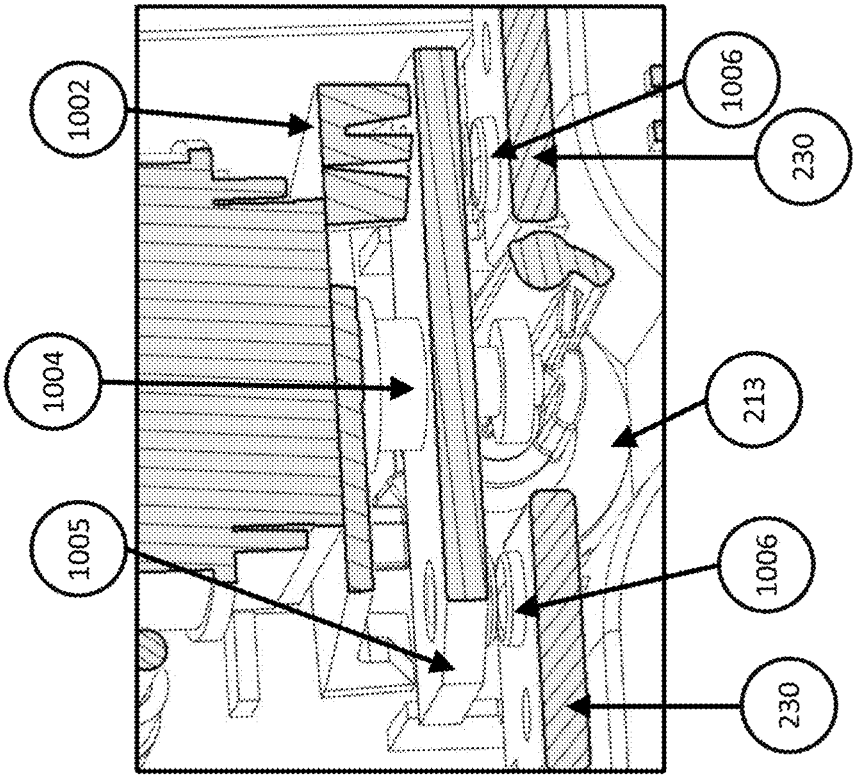
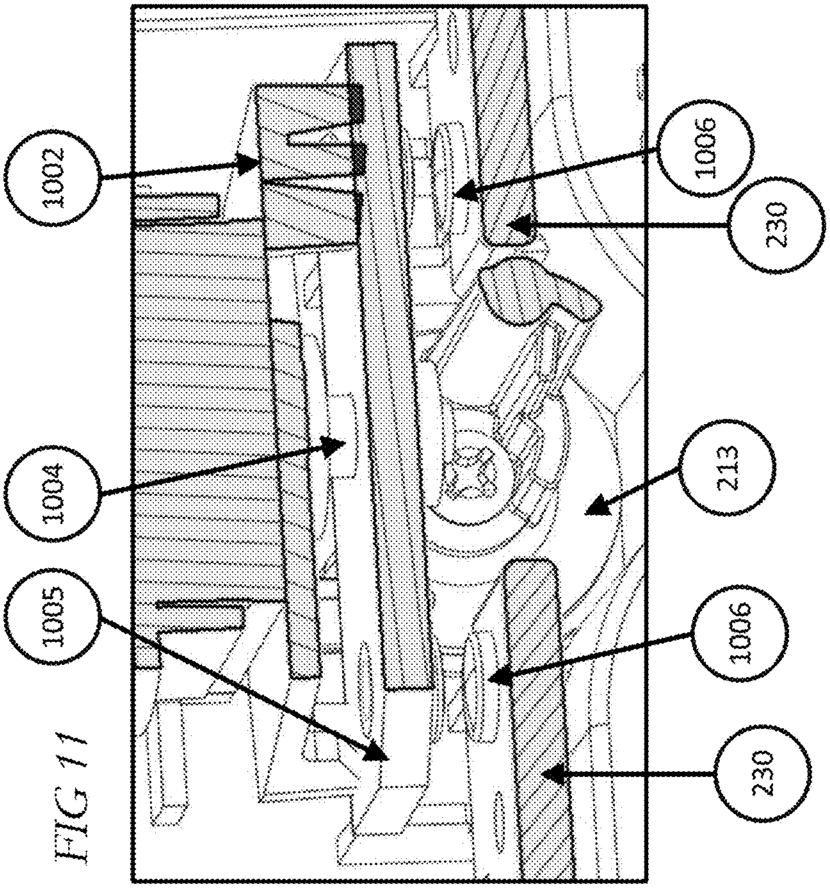
FIG 11

Knob mid rotation towards force Auto

Knob in Force ON Position

XD RELAY WITH MANUAL OVERRIDE KNOB

FEDERALLY SPONSORED RESEARCH

Not Applicable

SEQUENCE LISTING OR PROGRAM

Not Applicable

TECHNICAL FIELD OF THE PRESENT INVENTION

The present invention relates to high ampere electro-mechanical relays/solenoids. More specifically, the present invention relates to bi-stable high ampere electro-mechanical relays/solenoids for the marine and vehicle marketplaces.

BACKGROUND OF THE PRESENT INVENTION

The current state of bi-stable high ampere electro-mechanical relays/solenoids for the marine and vehicle marketplaces consists of products that provide less than optimal local manual control options from a user perspective, and the need for multiple high ampere devices in a single system causes system designers to use 7 or more devices in a single system.

The standard approach for manual control of bi-stable high ampere relays involves either (1) a push button on the sides of devices that force a device on but do allow for locking devices on or off or (2) rotary knobs that lock only turn a device off and lock a device off, or (3) a combination of #1 & #2.

Moreover, the location of these buttons on the sides of these devices results in a challenge to communicate to operators how to use the device and for operators to quickly understand the device's operation. The locations of these knobs are currently determined based on the same direction as the solenoid open/close direction which causes this problem.

What is needed is a simple and clear rotary actuator that is designed to be mounted on the top surface of a relay and by rotating the actuator one can force the device on and lock the device on. Similarly, if the rotary actuator is rotated to force the device off it should also allow for locking the device off. The location of the rotary actuator also allows for simple and clear labels around the actuator which make operation and status obvious and clear to any operator.

Additionally, many existing devices also contain microprocessors that are never turned off, therefore the more individual devices in a single system, the higher the likelihood of long-term battery drain if a system is left with its charging sources turned off.

Additionally, so many individual devices take up a lot of room and must be connected together. What is needed in today's complex electric systems are products which combine the functionality and performance of multiple independent relays into a single device in a very compact footprint. This would reduce standby power drain, overall space for installation, and cost of product and installation.

Finally, when designing and producing assemblies with multiple bi-stable relays, it is important to understand that application needs will require that some relays within those assemblies should have manual override actuators, and other relays should not have manual override actuators.

What is needed is a novel method to implement mechanical override functionality for each relay location within a higher level assembly, and for the locations which do not require manual override actuation, there should not me a manual override. The potential permutations of resulting solutions necessitates a flexible design approach which requires a minimum number of unique components and provides for a simple way to create any permutation desired with a minimum of lead time.

SUMMARY OF THE INVENTION

The present invention is a modular family of electrical switching relays that utilize interchangeable mechanical override knobs or blank fillers, combined with enclosures capable of containing two or more independently operable relays; where each independent operating relay can selectively be constructed to either have a mechanical override knob or to have a blank tiller thus resulting in a broad number of product permutations from a minimum number of unique components that are required to build those permutations.

In one embodiment, a light pipe o-ring goes over the light piper before it is inserted in the housing case. The knob o-ring is assembled over the knob and seals between the knob and the housing case as it is inserted. The retention screw passes through the Cam and screws into the knob. Each terminal studs assembles from the inside the case through a washer and a hole in the PCBA and then through a hole in an internal copper busbar that transfers the electrical power potential to fixed electrical contacts and then through a case opening and finally into a threaded female square nut assembled from the outside.

The ON follower fits over a plastic production that is part of the solenoid frame and also around the movable plunger. A conical spring is then placed against the On follower and around the plunger and pushes against the movable busbar. The movable busbar is permanently assembled to the plunger after being assembled over a smaller diameter section of the movable plunger and a steel washer is assembled to an even smaller diameter section of the movable plunger. The movable busbar has two silver alloy contacts that are press riveted to be permanently attached and achieve minimal electrical resistance between the two components. The end tip of the steel plunger is orbital riveted to secure the washer. While the conical spring applies force to the movable busbar, a second compression spring assembled on the bottom side of the solenoid frame into a cylindrical recess in the plunger will apply force to the plunger.

The solenoid frame is positioned against the bottom of the case but the case have horizontal and vertical registration features in the plastic case. The input and output busbars that are shown in the past as screwed into the case, also have riveted silver alloy contacts. The silver alloy contacts offer superior resistance to tack welding when the electrical relay opens and closes under voltage and high current.

The movable cam for the manual override version is also show and in the On position it is shown that cam features will not interfere with the movable busbar or plunger washer.

Power is conveyed from one fixed input busbar through an electrical contact into an electrical contact in the movable busbar then into the movable busbar then passing to the opposite electrical contact in the movable busbar then finally into the electrical contact in a second fixed input busbar.

Contact force is generated by the cylindrical plunger compression spring acting on the plunger which is then acting to push on the movable busbar; and the conical spring that consistently applies direct force on the movable busbar. Importantly, the plunger travels a longer distance that the movable busbar because the thickness of the movable busbar is much smaller than the length of the plunger section which the busbar freely moves back and forth along.

In the On position, this allows the magnet attraction distance between the plunger and the solenoid frame to be increased, which reduces the magnetic attraction force that is acting to pull the plunger closed.

After an electrical pulse through the solenoid wires the electro-motive force pulls the plunger towards the pole face and overcomes the combined forces of both springs. As the plunges moves closer to the pole face, the permanent magnet within the solenoid further adds to the EMF force of the electrical pulse signal. When the pulse signal is removed, the force of the permanent magnet maintains the Off position. The plunger washer acts to force the movable busbar to move by a defined distance that ensure the movable electrical contacts are a sufficient distance away from the electrical contacts pressed into the fixed input busbar.

The Cam surfaces are designed to force the device Off are rotating and beginning to force the plunger washer and the movable busbar towards their Off positions. With the relay now in the Off position with the knob (and internal cam) now fully rotated towards the Off position. The Cam surfaces are designed to force the device Off have completely rotated and are forcing the plunger washer and the movable busbar to remain in their Off positions.

The On Follower that rotates around a perpendicular axis to the cam. The Cam Surface forces the On follower to a position where it does not rotate. As the knob and cam rotate toward the On position, the Cam surface will rotate towards On follower surface.

Interference is created when the On follower is fully rotated to the Forced On position by the Cam. The interference acts as a wedge between the fixed solenoid frame and the movable busbar forcing the movable busbar from the Off position to the On position. Forcing the movable busbar also forces the plunger away from its magnetic pole face where significant magnetic holding force holds the plunger in the Off position. Once the plunger is forced away, the magnetic holding force is not able to overcome the forces of two conical and cylindrical compression springs and the result is that the plunger will move to its normal expected On position.

With the On follower in the Forced On position, the movable busbar is unable to be moved to the Off position and while the Plunger could move partially to the Off position, once the plunger washer comes into intimate contact with the movable busbar, the On follower will equally prevent the plunger from further movement towards the Off position.

When the knob and cam are partially rotated away from the Forced On position towards the Auto position. The surfaces have become in intimate contact and further rotation of the cam clockwise with rotate the On follower clockwise.

LIST OF REFERENCE CHARACTERS

| Item # | Description |
|---|---|
| 110 | single relay |
| 120 | double relay |
| 130 | triple relay |
| 210 | single relay housing case |
| 211 | single relay terminal cover |
| 212 | manual override knob |
| 213 | manual override cam |
| 214 | single relay housing back |
| 215 | dip switch cover |
| 217 | no knob filler |
| 218 | no knob washer |
| 220 | solenoid assembly |
| 230 | left/right busbar |
| 231 | cable terminal pad |
| 232 | center busbar |
| 240 | cable post nut |
| 241 | cable post washer |
| 242 | cable post |
| 243 | knob screw |
| 250 | printed wiring board |
| 260 | terminal pad o-ring seal |
| 261 | light pipe o-ring seal |
| 262 | knob hole o-ring seal |
| 270 | label |
| 280 | light pipe |
| 1001 | solenoid coil/frame/magnet assembly |
| 1002 | on follower |
| 1003 | movable link bar spring |
| 1004 | plunger |
| 1005 | movable link bar |
| 1006 | electrical contacts |
| 1006A | link bar input contact |
| 1006B | input busbar contact |
| 1006C | link bar output contact |
| 1006D | output busbar contact |
| 1007 | retaining washer |
| 1008 | plunger spring |
| 2001 | cam off actuation surfaces |
| 2002 | cam on actuation surface |
| 2003 | cam auto actuation surface |
| 2004 | cam auto maintain surface |
| 3001 | on follower actuation on surface |
| 3002 | on follower actuation auto surface |

BRIEF DESCRIPTION OF THE DRAWINGS

The accompanying drawings, which are incorporated herein form a part of the specification, illustrate the present invention and, together with the description, further explain the principles of the present invention and to enable a person skilled in the pertinent art to make and use the present invention.

FIG. 11 shows a cross-section of the device in the Off position and highlights the interference that is created when the On follower 1002 is fully rotated to the Forced On position by the Cam 213.

FIG. 12 shows the same view as FIG. 11, but now with the movable busbar and the plunger in the On position.

DETAILED DESCRIPTION OF THE PRESENT INVENTION

Figure 1:
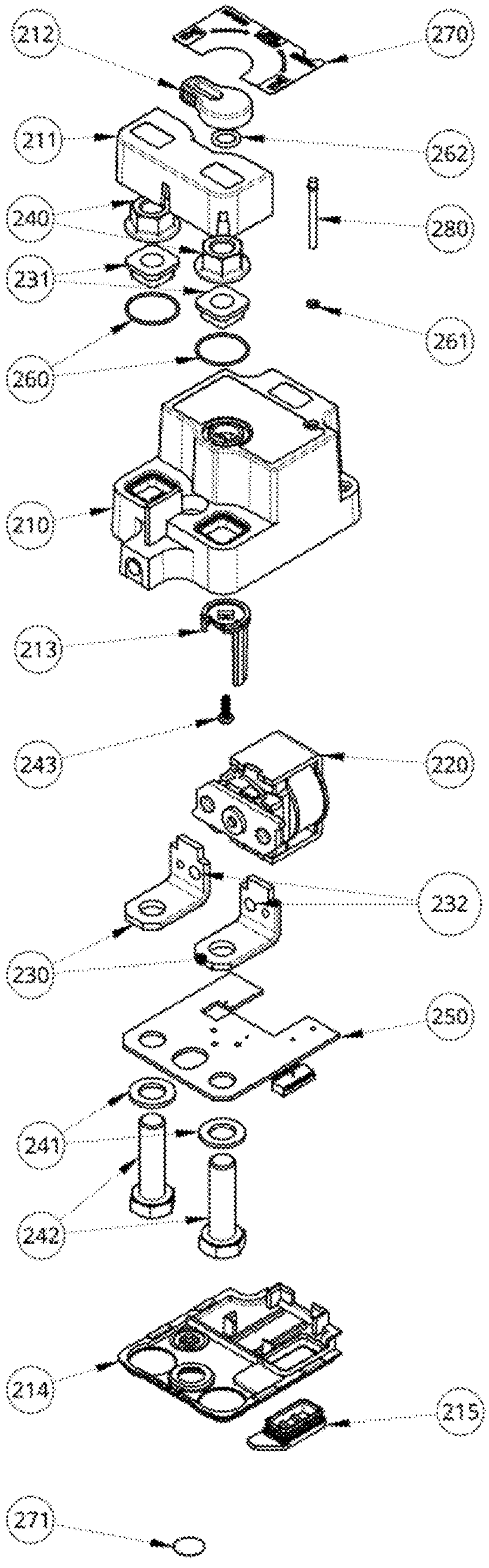
FIG. 1 is an exploded view of the single XD Relay with Manual Override Knob.

In the following detailed description of the present invention of exemplary embodiments of the present invention, reference is made to the accompanying drawings (where like numbers represent like elements), which form a part hereof, and in which is shown by way of illustration specific exemplary embodiments in which the present invention are practiced. These embodiments are described in sufficient detail to enable those skilled in the art to practice the present invention, but other embodiments are utilized and logical, mechanical, electrical, and other changes are made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention are practiced without these specific details. In other instances, well-known structures and techniques known to one of ordinary skill in the art have not been shown in detail in order not to obscure the present invention.

The present invention is a modular family of electrical switching relays that utilize interchangeable mechanical override knobs or blank fillers, combined with enclosures capable of containing two or more independently operable relays; where each independent operating relay can selectively be constructed to either have a mechanical override knob or to have a blank filler thus resulting in a broad number of product permutations from a minimum number of unique components that are required to build those permutations.

An electromechanical relay with rotary manual on and off override control where the manual on and off control consists of three distinct positions for (1) forcing/maintaining the relay on, (2) forcing/maintaining the relay off, and (3) allowing the relay to automatically turn on and off or to be remotely turned on and off with an electrical signal: where the manual control axis is perpendicular to the axis of relay operation; where the relay solenoid includes a magnet to allow bistable operation and not require electrical current in the solenoid windings to maintain the electrical switch in the on or off position; where the relay includes a printed wiring board and microprocessor to receive external and internal inputs, and automatically open or close the relay in response to those inputs and the internal microprocessor program; and where the printed wiring board contains one or more configurable mechanical device such as rotary switches or dip switches accessible by installers and operators that allows an installer/operator to set device configuration settings.

In an alternative embodiment, the present invention teaches an electromechanical push/pull relay with manual on and off override control where the axis of rotation of the manual override control is perpendicular to the axis of relay push/pull direction: where the manual on and off control consists of three distinct positions for (1) forcing/maintaining the relay on, (2) forcing/maintaining the relay off, and (3) allowing the relay to automatically turn on and off or to be remotely turned on and off with an electrical signal; where the relay solenoid includes a magnet to allow bistable operation and not require electrical current in the solenoid windings to maintain the electrical switch in the on or off position; where the relay includes a printed wiring board and microprocessor to receive external and internal inputs, and automatically open or close the relay in response to those inputs and the internal microprocessor program; and where the printed wiring board contains one or more configurable mechanical device such as rotary switches or dip switches accessible by installers and operators that allows an installer/operator to set device configuration settings.

FIG. 1 is an exploded view of the single XD Relay With Manual Override Knob. The light pipe o-ring goes over the light piper before it is inserted in the housing case. The knob o-ring is assembled over the knob and seals between the knob and the housing case as it is inserted. The retention screw passes through the Cam and screws into the knob. Each terminal studs assembles from the inside the case through a washer and a hole in the PCBA and then through a hole in an internal copper busbar that transfers the electrical power potential to fixed electrical contacts and then through a case opening and finally into a threaded female square nut assembled from the outside.

Figure 2:
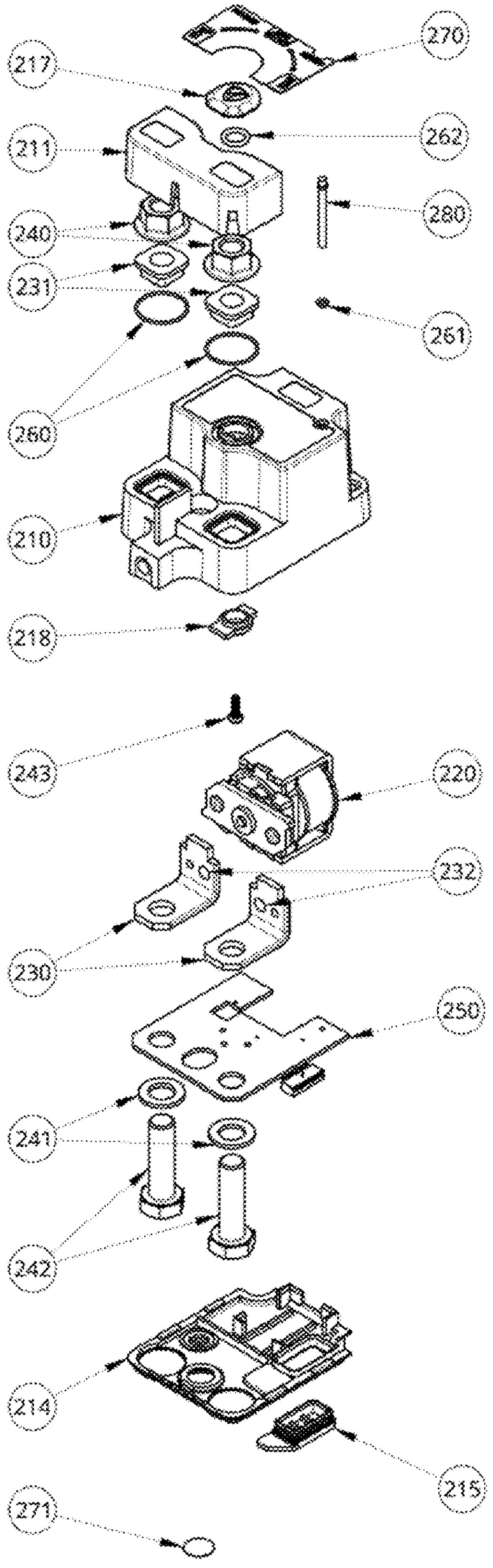
FIG. 2 is an exploded view of the single XD Relay with Manual Override Knob where the knob is replaced with a top filler nut, and the internal Cam is replaced with a filler washer.

FIG. 2 is basically the same as FIG. 1, except the knob is replaced with a top filler nut, and the internal Cam is replaced with a filler washer.

Figure 3:
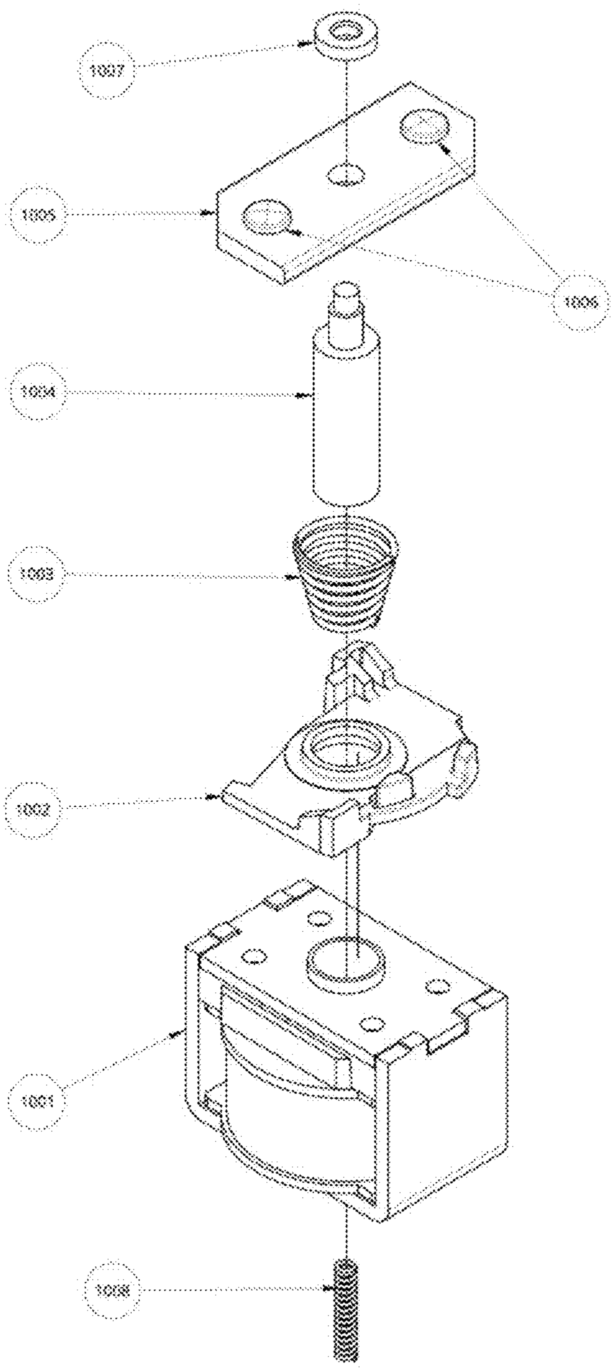
FIG. 3 is an exploded view of the solenoid assembly, which contains components not called out in figures #1 and #2.

FIG. 3 is an exploded view of the solenoid assembly, which contains components not called out in FIGS. 1 and 2. The exploded assembly direction is perpendicular to the exploded direction for FIGS. 1 and 2. The ON follower fits over a plastic production that is part of the solenoid frame and also around the movable plunger. A conical spring is then placed against the On follower and around the plunger and pushes against the movable busbar. The movable busbar is permanently assembled to the plunger after being assembled over a smaller diameter section of the movable plunger and a steel washer is assembled to an even smaller diameter section of the movable plunger. The movable busbar has two silver alloy contacts that are press riveted to be permanently attached and achieve minimal electrical resistance between the two components. The end tip of the steel plunger is orbital riveted to secure the washer. While the conical spring applies force to the movable busbar, a second compression spring assembled on the bottom side of the solenoid frame into a cylindrical recess in the plunger will apply force to the plunger.

Figure 4:
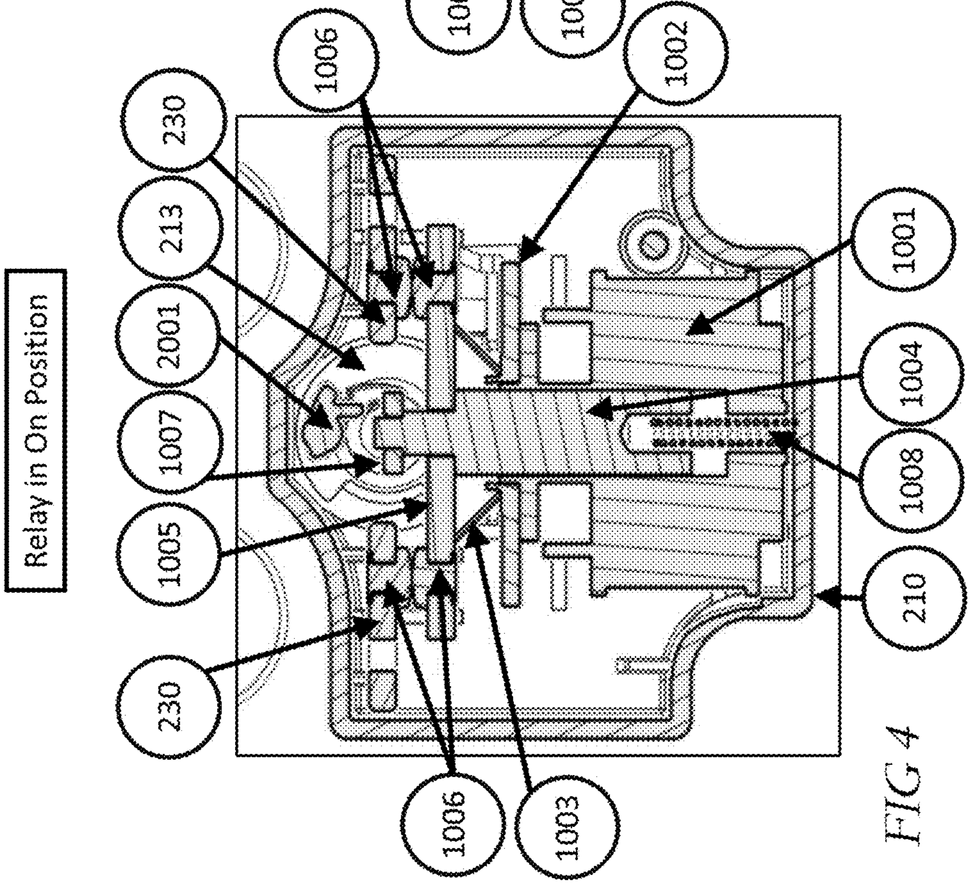
FIG. 4 shows a cross-section of the solenoid and movable power switching elements with the relay in the On position.

FIG. 4 shows a cross-section of the solenoid and movable power switching elements with the relay in the On position. The solenoid frame is positioned against the bottom of the case but the case (and back cover not shown) have horizontal and vertical registration features in the plastic case. The input and output busbars 230 that are shown in the past as screwed into the case, also have riveted silver alloy contacts.

The silver alloy contacts offer superior resistance to tack welding when the electrical relay opens and closes under voltage and high current.

In the cross section, the movable cam for the manual override version is also show and in the On position it is shown that cam features will not interfere with the movable busbar or plunger washer. Power is conveyed from one fixed input busbar through an electrical contact into an electrical contact in the movable busbar then into the movable busbar then passing to the opposite electrical contact in the movable busbar then finally into the electrical contact in a second fixed input busbar.

Contact force is generated by the cylindrical plunger compression spring acting on the plunger which is then acting to push on the movable busbar; and the conical spring that consistently applies direct force on the movable busbar. Importantly, the plunger travels a longer distance that the movable busbar because the thickness of the movable busbar is much smaller than the length of the plunger section which the busbar freely moves back and forth along. In the On position, this allows the magnet attraction distance between the plunger and the solenoid frame to be increased, which reduces the magnetic attraction force that is acting to pull the plunger closed.

Figure 5:
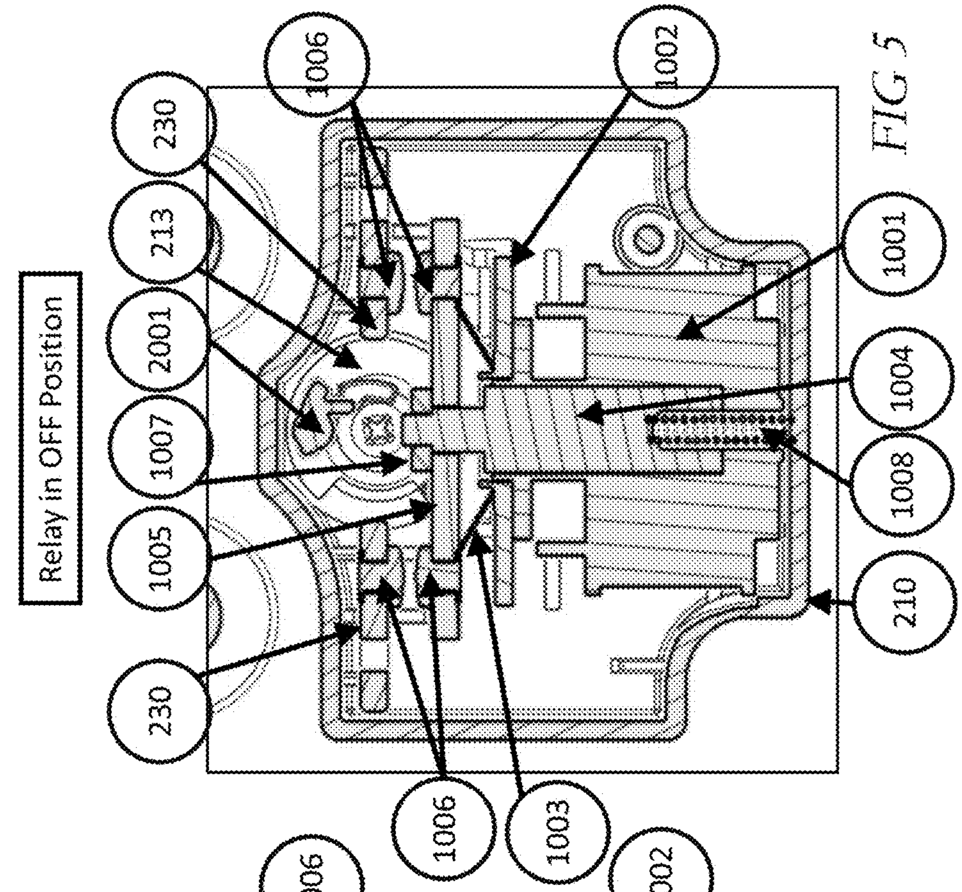
FIG. 5 depicts the same cross section from FIG. 4, but with the relay Off.

FIG. 5 depicts the same cross section from FIG. 4, but with the relay Off After an electrical pulse through the solenoid wires the electro-motive force pulls the plunger towards the pole face and overcomes the combined forces of both springs. As the plunges moves closer to the pole face, the permanent magnet within the solenoid further adds to the EMF force of the electrical pulse signal. When the pulse signal is removed, the force of the permanent magnet maintains the Off position. The plunger washer acts to force the movable busbar to move by a defined distance that ensure the movable electrical contacts are a sufficient distance away from the electrical contacts pressed into the fixed input busbar.

FIGS. 4 & 5 show the device turning on/off remotely with the manual know left in the Auto position.

Figure 7:
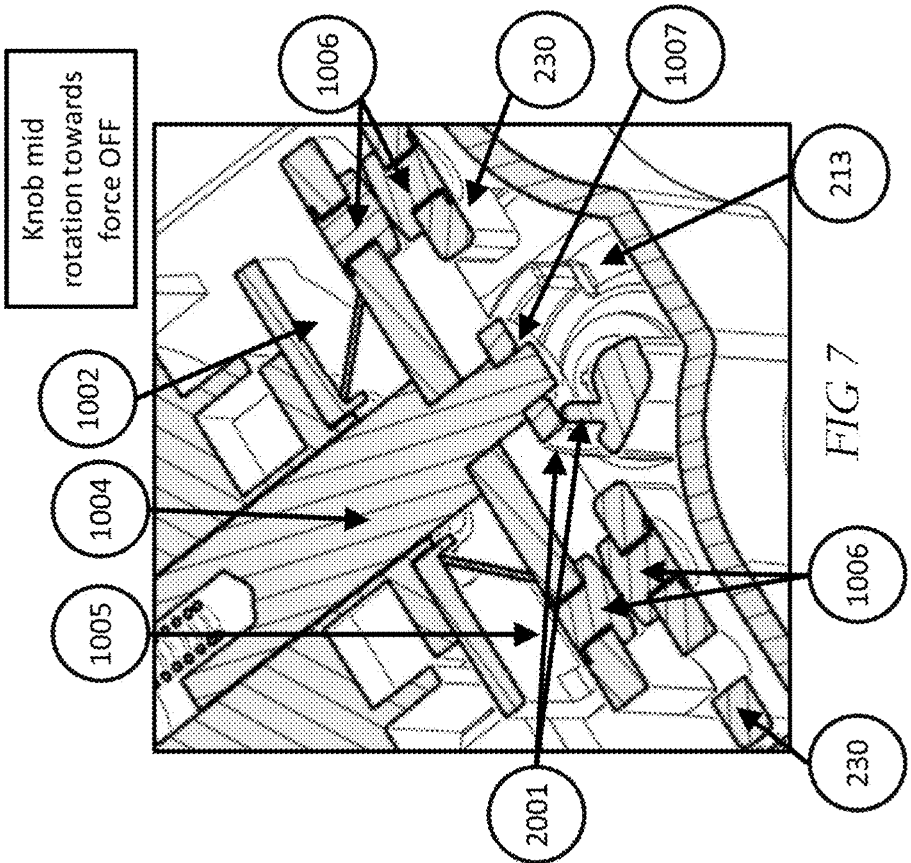
FIGS. 6-8 show the sequence of the knob/cam rotating and forcing the relay to the Off position.
Figure 6:
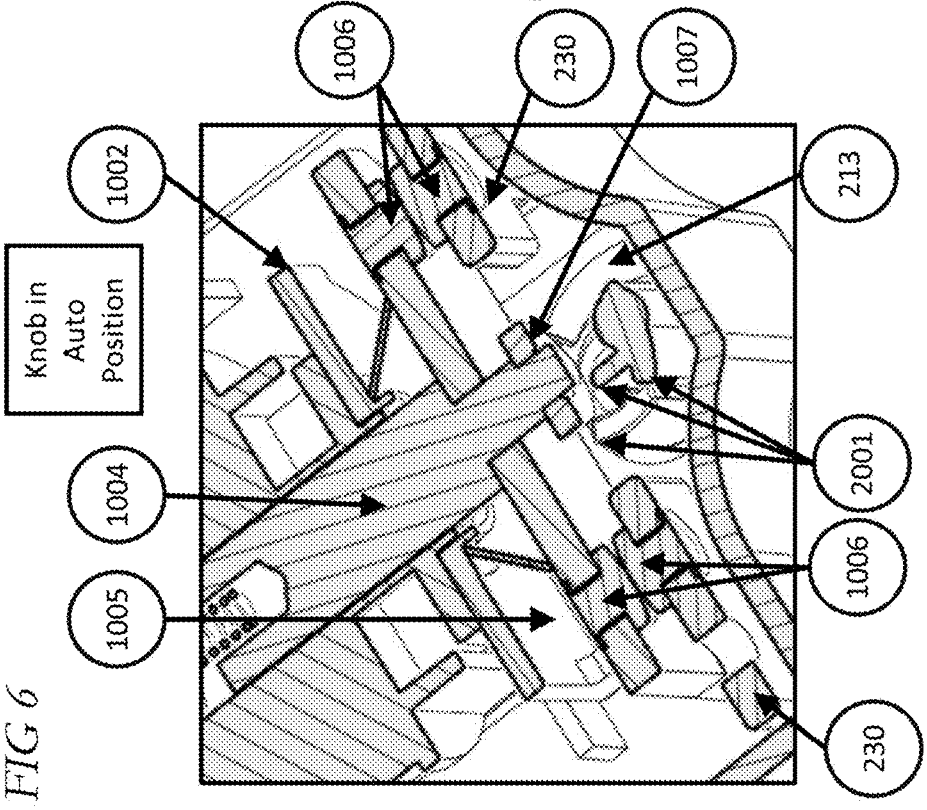
Figure 8:
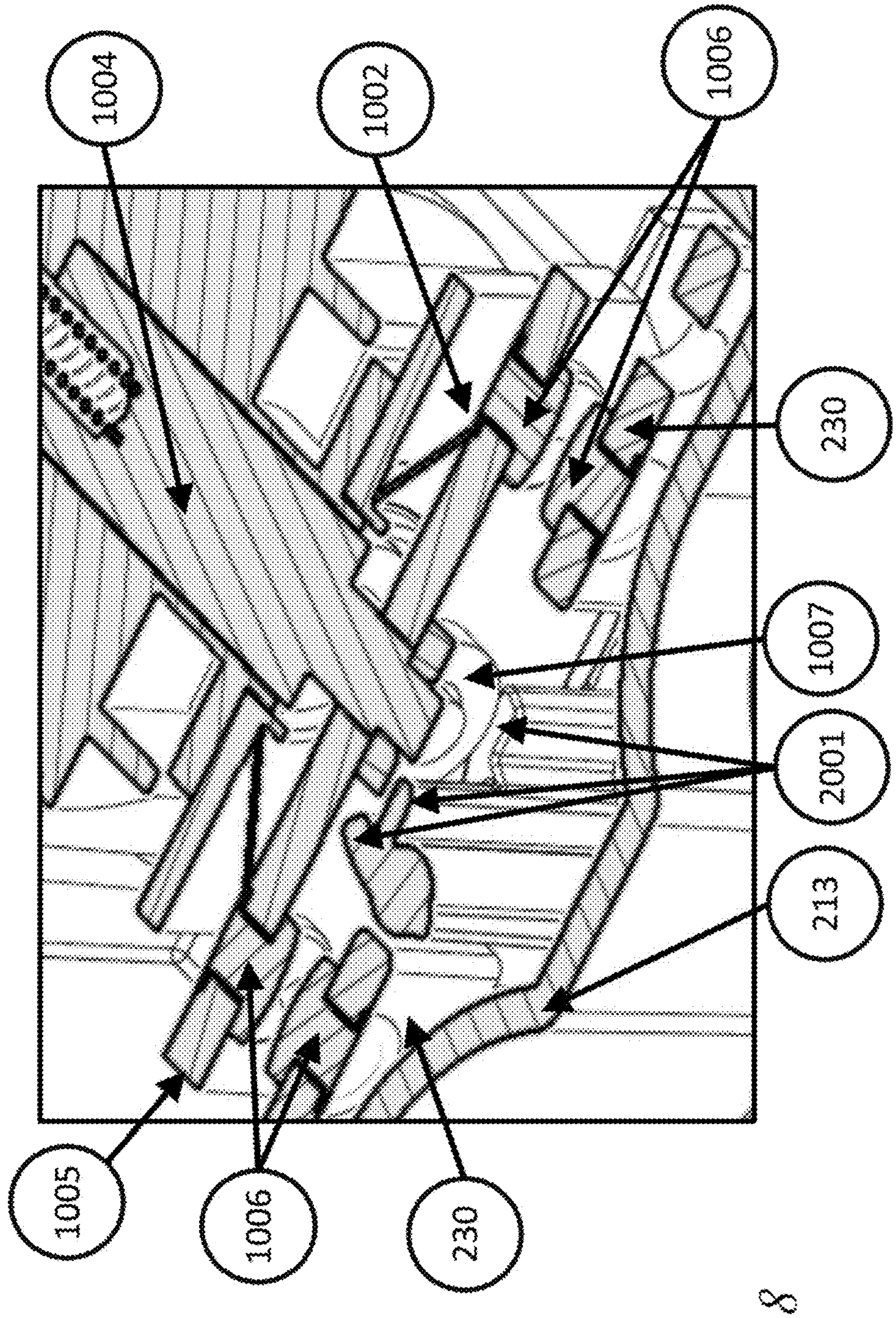

FIGS. 6-8 show the sequence of the knob/cam rotating and forcing the relay to the Off position.

FIG. 6 shows a similar cross-section of the device (as was in FIG. 4) in the On position with the knob (and internal cam) in the Auto position, except with an Isometric perspective to show how the Cam surfaces 2001 designed to force the device Off, are not interfering with the plunger washer 1007 or the movable busbar 1005

FIG. 7 shows a similar cross-section of the device (as was in FIG. 6) with the relay in the On position with the knob (and internal cam) partially rotated towards the Off position. The Cam surfaces 2001 designed to force the device Off are rotating and beginning to force the plunger washer 1007 and the movable busbar 1005 towards their Off positions.

FIG. 8 shows a similar cross-section of the device (as was in FIG. 7) with the relay now in the Off position with the knob (and internal cam) now fully rotated towards the Off position. The Cam surfaces 2001 designed to force the device Off have completely rotated and are forcing the plunger washer 1007 and the movable busbar 1005 to remain in their Off positions.

Figure 10:
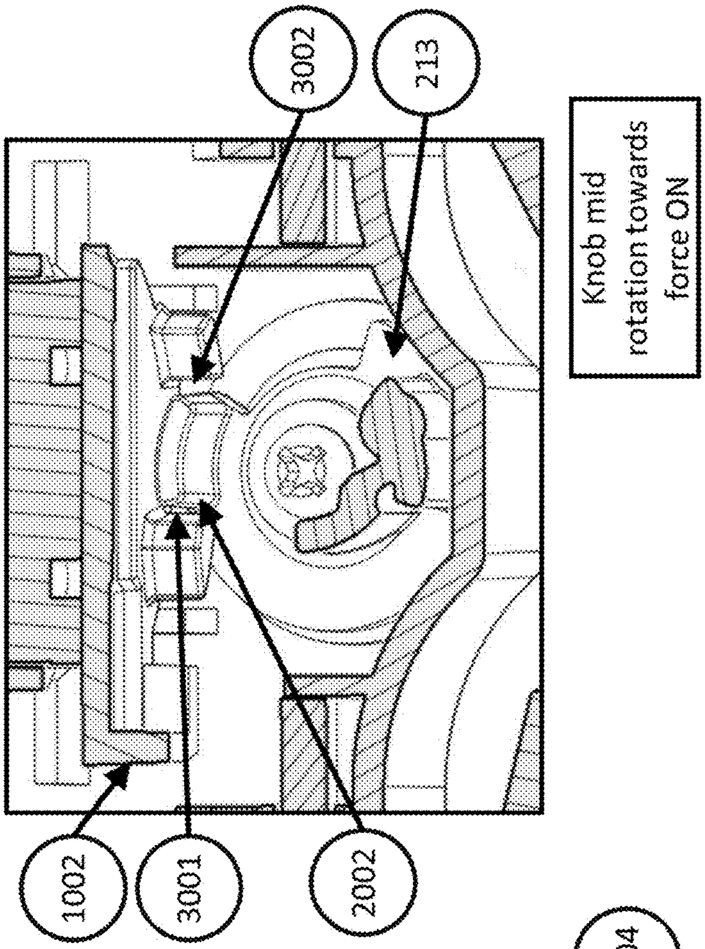
FIGS. 9-10 show the sequence of the know/cam rotating and forcing the relay to the On position.
Figure 9:
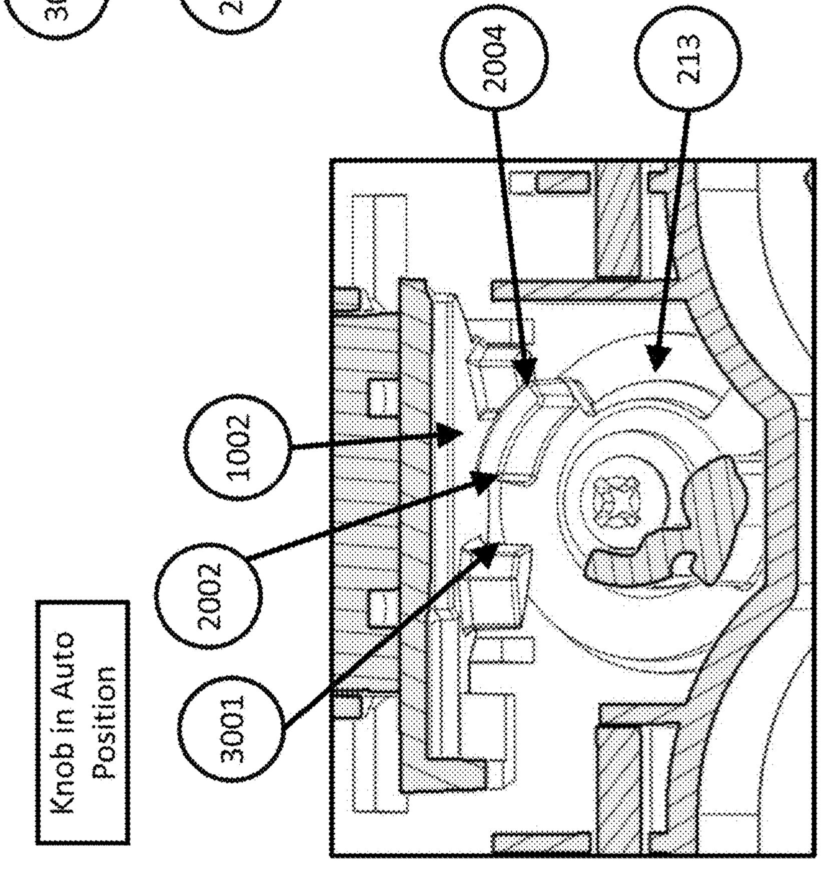

FIGS. 9-10 show the sequence of the know/cam rotating and forcing the relay to the On position.

FIG. 9 shows a cross section of the device that highlights the interaction between the rotating cam (controlled by the external knob) and the On Follower that rotates around a perpendicular axis to the cam. This shows the Cam 213 with Surface 2004 forcing the On follower to a position where it does not rotate. As the knob and cam rotate toward the On position, Cam surface 2002 will rotate towards On follower surface 3001.

FIG. 10 shows the same cross section as FIG. 9 but with the knob and cam rotated partially towards the On position. Cam surface 2002 is now in contact with On follower 1002 surface 3001 and further counter-clockwise rotation of the Cam in this view will rotate the On follower counter-clockwise.

FIG. 11 shows a cross-section of the device in the Off position and highlights the interference that is created when the On follower 1002 is fully rotated to the Forced On position by the Cam 213. The interference between the On Follower 1002 and the movable busbar 1005 is depicted. The interference acts as a wedge between the fixed solenoid frame and the movable busbar 1005 forcing the movable busbar from the Off position to the On position. Forcing the movable busbar also forces the plunger away from its magnetic pole face where significant magnetic holding force holds the plunger in the Off position. Once the plunger is forced away, the magnetic holding force is not able to overcome the forces of two conical and cylindrical compression springs and the result is that the plunger will move to its normal expected On position.

FIG. 12 shows the same view as FIG. 11, but now with the movable busbar and the plunger in the On position. Importantly, with the On follower in the Forced On position, the movable busbar is unable to be moved to the Off position and while the Plunger could move partially to the Off position, once the plunger washer comes into intimate contact with the movable busbar, the On follower will equally prevent the plunger from further movement towards the Off position.

Figure 13:
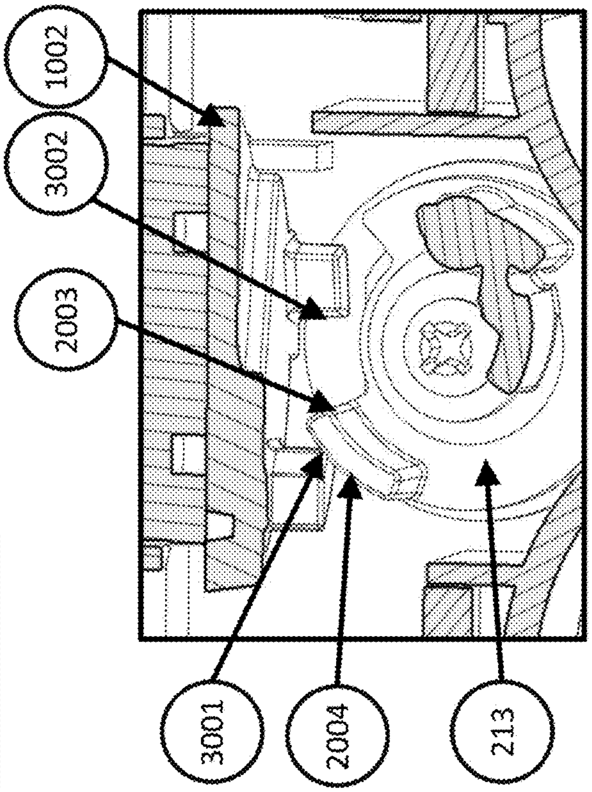
FIG. 13 shows the same view as FIG. 10 with the same cross-section, however the position of the knob and cam are now fully in the forced On position.

FIG. 13 shows the same view as FIG. 10 with the same cross-section, however the position of the knob and cam are now fully in the forced On position. This position is the same as depicted in the different view that FIG. 12 represents. The On follower has fully rotated and cam 213 surface 2004 is acting to force the On follower 1002 to stay in the Forced On position by maintaining contact with surface 3001 on the on follower. This position also shows the relevant features that are used when rotating the knob and Cam back to the Auto position. Cam 213 surface 2003 will rotate clockwise towards on follower 1002 surface 3002.

Figure 14:
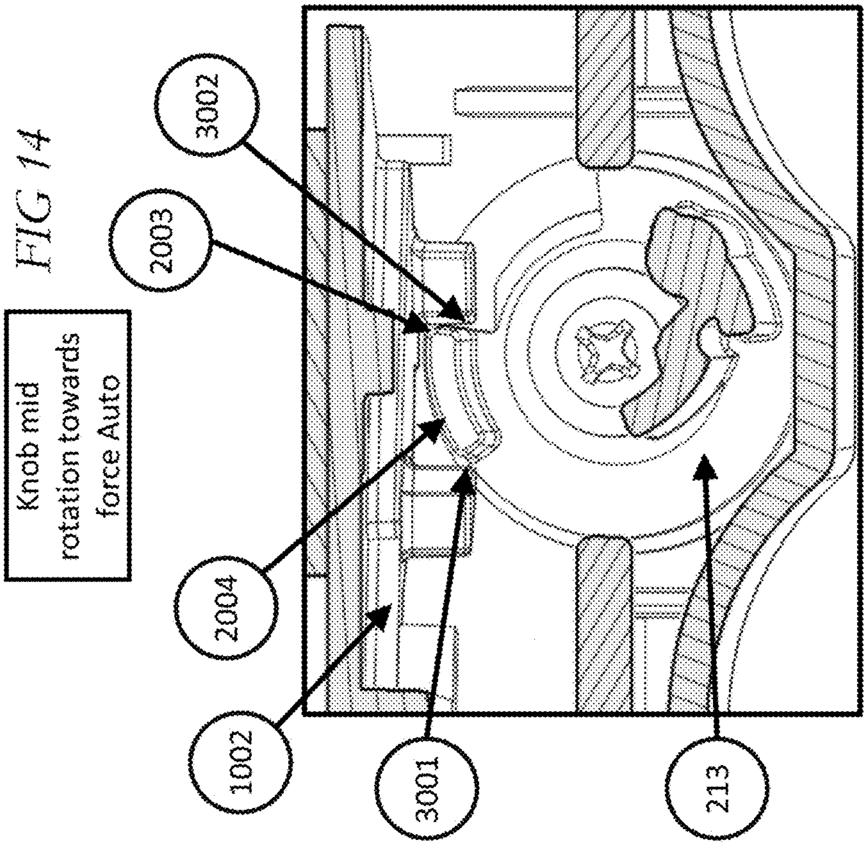
FIG. 14 shows the knob and cam partially rotated away from the Forced On position towards the Auto position.

FIG. 14 shows the knob and cam partially rotated away from the Forced On position towards the Auto position. Surfaces 2003 and 3002 have become in intimate contact and further rotation of the cam clockwise with rotate the On follower clockwise. As the cam continues to rotate, FIG. 9 represents the position of the Cam and On follower where the Cam surface 2004 maintains the On follower in a neutral Auto position where it no longer acts to prevent the movable busbar from moving to the Off position.

Figure 15:
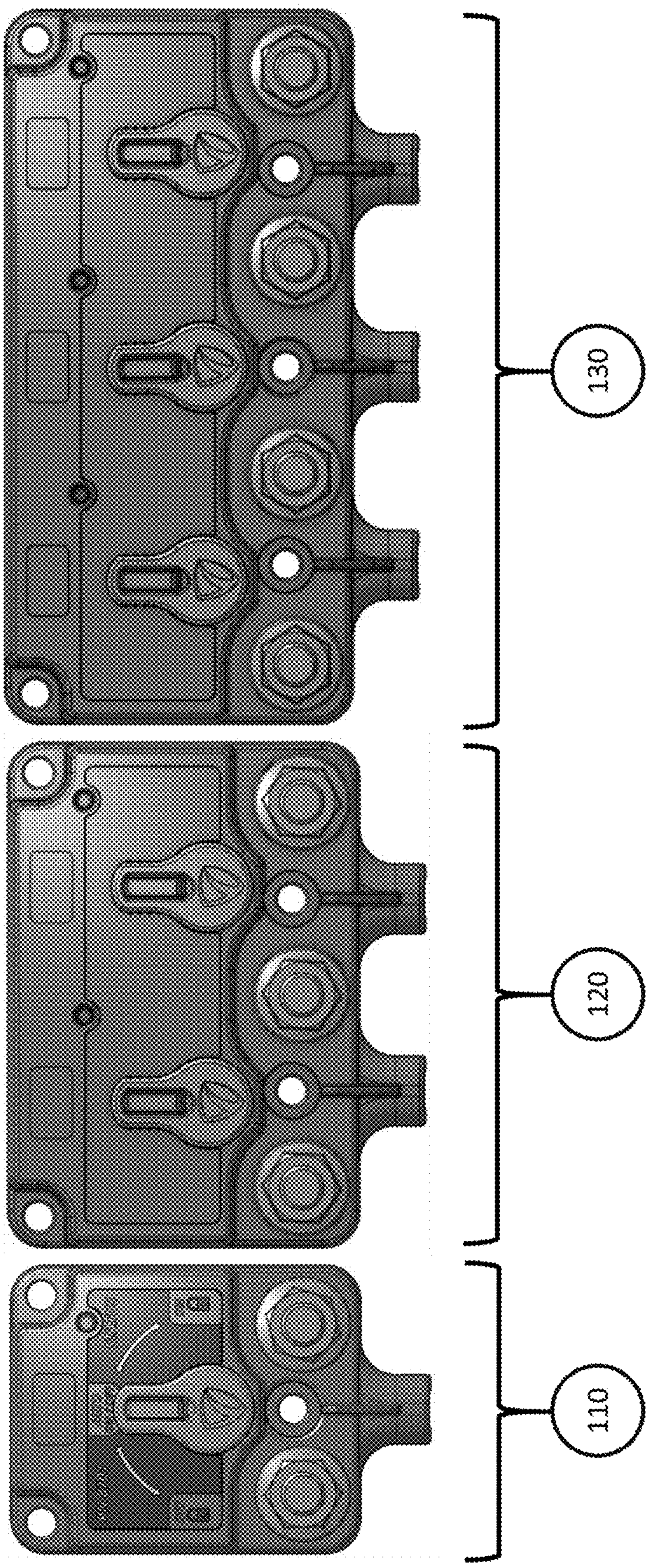
FIG. 15 shows the completed assemblies of three variations of the invention.

FIG. 15 shows the completed assemblies of three variations of the invention. A Single relay, a Dual relay, and a Triple relay. The dual relay 120 has two independent relays that can separately be remotely or manually turned on and off, or automatically turned on and off by microprocessor with a program designed to make autonomous on/off decisions based on internal measurements such as voltage. Similarly, the triple relay 130 has three independent relays.

Figure 16:
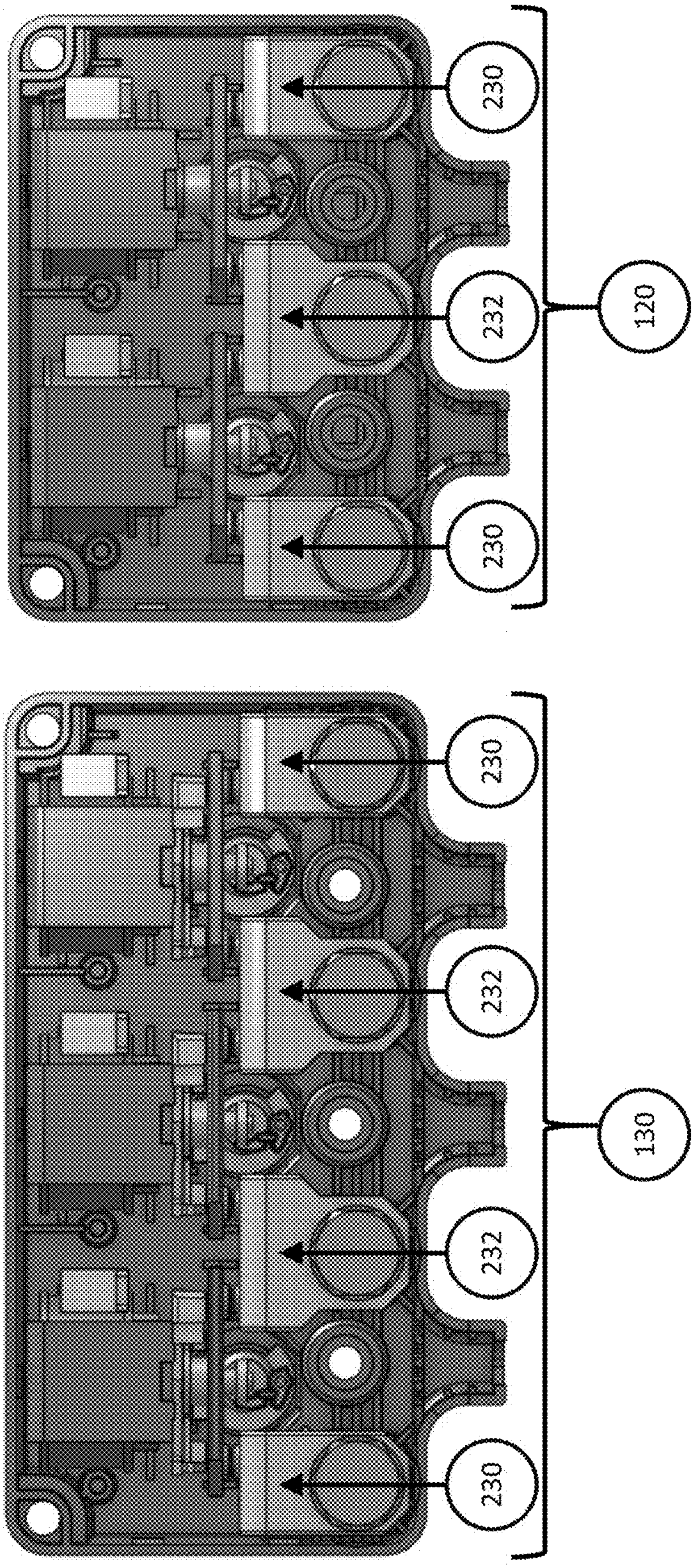
FIG. 16 shows the Inside views of the Dual relay 120 and the Triple relay 130.
Figure 18:
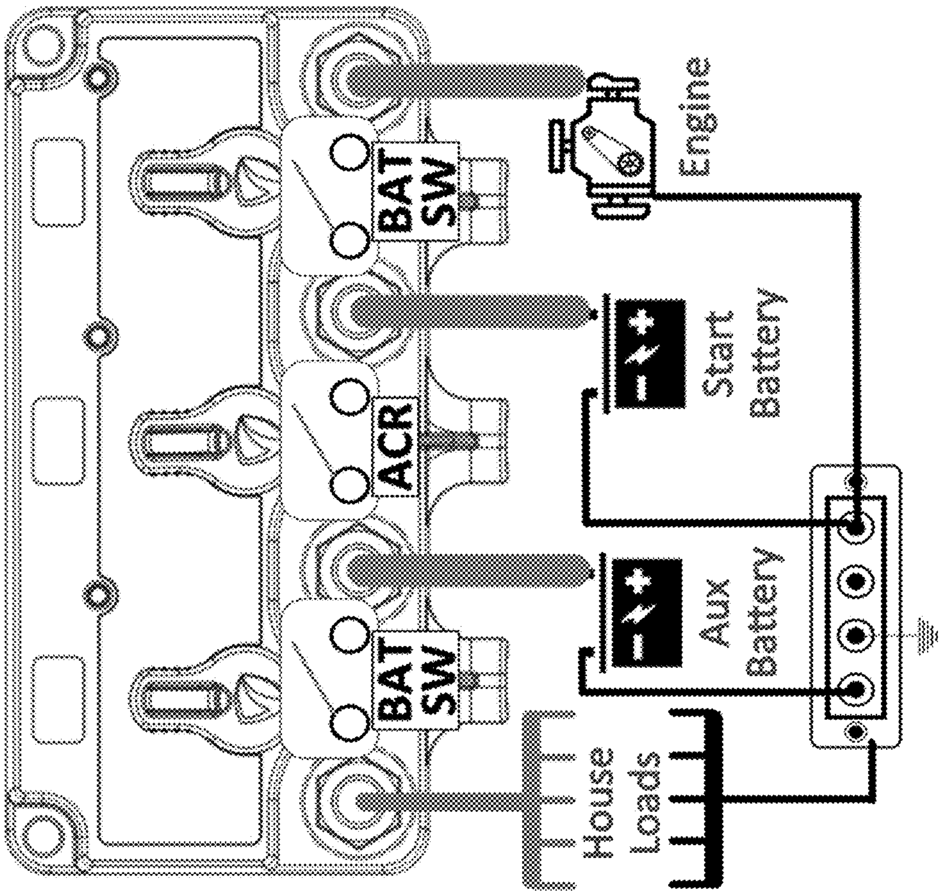
FIGS. 17-20 provide several common examples of application of the present invention.
Figure 17:
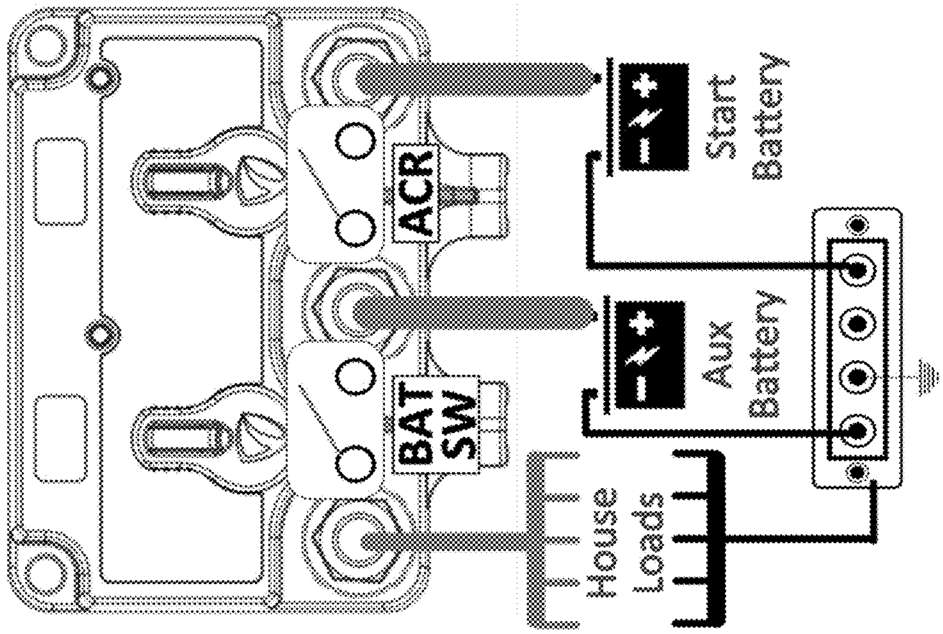
Figure 19:
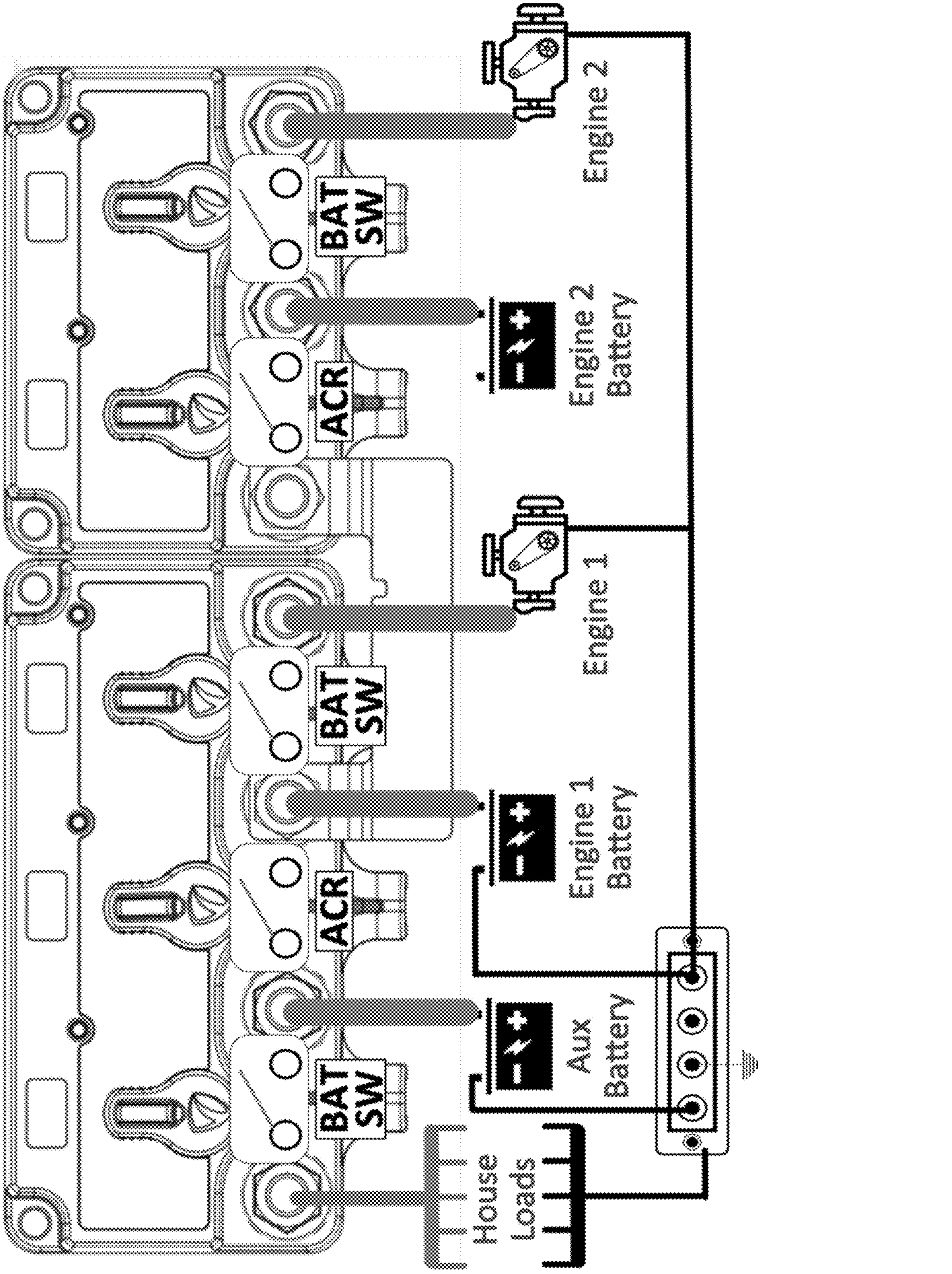
Figure 20:
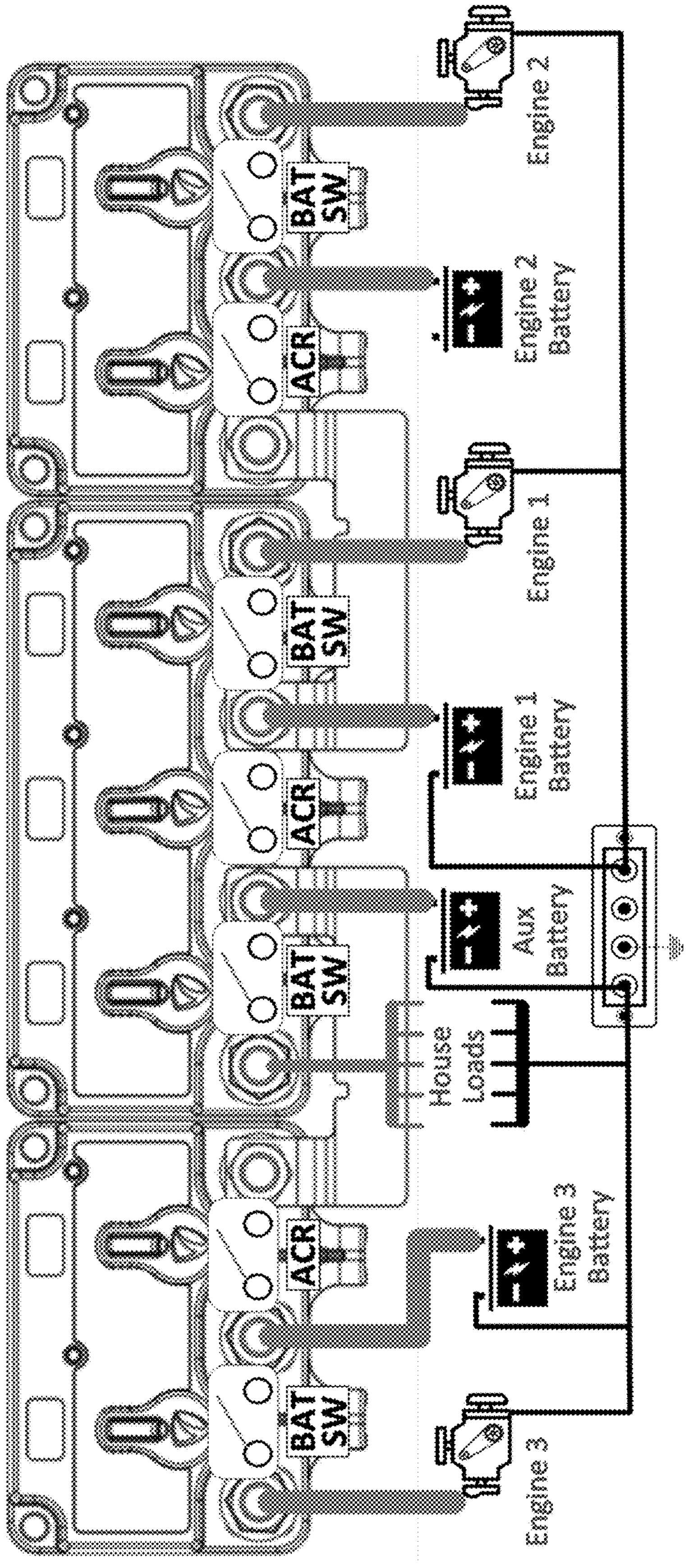

FIG. 16 shows the Inside views of the Dual relay 120 and the Triple relay 130. Importantly, the independent relays have external input terminals that tie together adjacent relays with center input busbars 232. The outside input busbars 230 are the same as outlined for the single relay 110. By connecting internally adjacent relay power connections, this provides benefits to the system designer because external connections no longer need to be made. There are many common electrical system functions that the dual relay 120 and the triple relay 130 support.

FIGS. 17 through 20 provide several common examples and applications of the present invention.

The benefits of this method of combining multiple relays into one enclosure instead of an installer being required to use separate single relays are (1) a much smaller footprint, (2) lower cost due to less electrical components and less material and less external interconnect materials, and less labor to install because fewer external interconnections, (3) lower labor time to install, (4) lower weight of installation, and (4) lower standby power due to only one processor for the dual and triple relays versus multiple microprocessors in single relay installations.

With respect to any necessary software or computer programming, the system is set to run on a computing device or mobile electronic device. A computing device or mobile electronic device on which the present invention can run is comprised of a CPU, storage device, keyboard, monitor or screen, CPU main memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the present invention. The system can also be written in several different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the present invention. Further, since numerous modifications and changes will readily occur to those skilled in the art, it is not desired to limit the present invention to the exact construction and operation shown and described, and accordingly, all suitable modifications and equivalents are resorted to, falling within the scope of the present invention.

The embodiments of the present invention in which an exclusive property or privilege is claimed are defined as follows:

1. An electromechanical relay with manual override knob, comprising the electromechanical relay configurable as part of a modular family of electrical switching relays, the electromechanical relay utilizing interchangeable mechanical override components comprising a manual override knob or a blank filler, and being housed within an enclosure capable of containing two or more of the electromechanical relay;

where the electromechanical relay is selectively constructed to either have the manual override knob or to have a blank filler, wherein the electromechanical relay is configured independently to include or exclude the manual override knob prior to assembly, thus resulting in a plurality of selectable product permutations from a minimum number of unique components;

a rotary manual on and off override control where the manual on and off control consists of three distinct positions for (1) forcing/maintaining the electromechanical relay on, (2) forcing/maintaining the electromechanical relay off, and (3) allowing the electromechanical relay to automatically turn on and off or to be remotely turned on and off with an electrical signal; and a printed wiring board contains one or more configurable mechanical device comprising rotary switches or dip switches separate from the main relay actuator and accessible to installers for non-volatile configuration that allows an installer/operator to set device configuration settings.

2. The electromechanical relay with manual override knob of claim 1, wherein a manual control axis is perpendicular to the axis of electromechanical relay operation.

3. The electromechanical relay with manual override knob of claim 1, wherein a relay solenoid includes a permanent magnet to allow bi-stable operation and not require electrical current in a solenoid windings to maintain the electromechanical relay in the on or off position.

4. The electromechanical relay with manual override knob of claim 1, wherein the electromechanical relay includes a printed wiring board and microprocessor to receive external and internal inputs, and automatically open or close the electromechanical relay in response to the internal inputs and internal microprocessor program.

5. The electromechanical relay with manual override knob of claim 1, wherein the electromechanical relay with a manual override knob is configured to provide manual on and off control where an axis of rotation of the manual override control is perpendicular to an axis of relay push/pull direction.

6. The electromechanical relay with manual override knob of claim 5, wherein the manual override knob is configured to provide control via three distinct positions for (1) forcing/maintaining the electromechanical relay on, (2) forcing/maintaining the electromechanical relay off, and (3) allowing the electromechanical relay to automatically turn on and off or to be remotely turned on and off with an electrical signal.

7. The electromechanical relay with manual override knob of claim 6, wherein a relay solenoid includes a magnet to allow bi-stable operation and not require electrical current in a solenoid windings to maintain the electrical switch in the on or off position.

8. The electromechanical relay with manual override knob of claim 6, wherein the electromechanical relay includes a printed wiring board and microprocessor to receive external and internal inputs, and automatically open or close the electromechanical relay in response to the internal inputs and internal microprocessor program.

9. The electromechanical relay with manual override knob of claim 6, wherein a printed wiring board contains one or more configurable mechanical device comprising rotary switches or dip switches accessible by installers and operators that allows an installer/operator to set device configuration settings.

* * * * *